(12) United States Patent
Naganuma et al.

(10) Patent No.: US 6,310,717 B1
(45) Date of Patent: Oct. 30, 2001

(54) OPTICAL AMPLIFIER AND FIBER MODULE FOR OPTICAL AMPLIFICATION

(75) Inventors: Norihisa Naganuma; Norifumi Shukunami, both of Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/313,783

(22) Filed: May 17, 1999

(30) Foreign Application Priority Data

Sep. 9, 1998 (JP) .................................................. 10-255433

(51) Int. Cl.[7] ...................................................... H01S 3/00
(52) U.S. Cl. ........................................ 359/341.1; 359/341.5
(58) Field of Search .................................. 359/341, 341.1, 359/341.5

(56) References Cited

U.S. PATENT DOCUMENTS 5,309,452 * 5/1994 Ohishi et al. .............................. 372/6

FOREIGN PATENT DOCUMENTS

| 03-248487 | 11/1991 | (JP) . |
| 0653575 | 2/1994 | (JP) . |
| WO96/37019 | * 11/1996 | (WO) . |

* cited by examiner

*Primary Examiner*—Mark Hellner
(74) *Attorney, Agent, or Firm*—Staas & Halsey LLP

(57) ABSTRACT

Disclosed herein is an optical amplifier reduced in gain deviation. The optical amplifier includes a nonsilica fiber doped with a rare earth, and a fiber holder in which the nonsilica fiber is inserted and fixed. The fiber holder is optically arranged so that signal light to be amplified propagates in the nonsilica fiber. The nonsilica fiber is pumped so that the nonsilica fiber provides a gain band including the wavelength of the signal light. Opposite ends of the fiber holder are hermetically sealed to thereby easily cut off the nonsilica fiber from the outside air, so that the nonsilica fiber is stabilized physically or chemically. A fluoride glass fiber is suitable for the nonsilica fiber to reduce the gain deviation in a 1.55 $\mu$m band.

31 Claims, 7 Drawing Sheets

OPTICAL AMPLIFIER AND FIBER MODULE FOR OPTICAL AMPLIFICATION

BACKGROUND OF THE INVENTION

1. Field of the Invention

The present invention relates to an optical amplifier and a fiber module for optical amplification. The present invention relates also to an apparatus usable as a white light source provided by the optical amplifier according to the present invention.

2. Description of the Related Art

In recent years, a manufacturing technique and using technique for a low-loss (e.g., 0.2 dB/km) silica optical fiber have been established, and an optical communication system using the optical fiber as a transmission line has been put into practical use. Further, to compensate for losses in the optical fiber and thereby allow long-haul transmission, the use of an optical amplifier for amplifying an optical signal or signal light has been put into practical use.

An optical amplifier known in the related art includes an optical amplifying medium to which signal light to be amplified is supplied and a means for pumping the optical amplifying medium so that the optical amplifying medium provides a gain band including the wavelength of the signal light.

For example, an erbium doped fiber amplifier (EDFA) has already been developed to amplify signal light in a 1.55 $\mu$m band where the loss in a silica fiber is low. The EDFA includes an erbium doped fiber (EDF) as the optical amplifying medium and a pump light source for supplying pump light having a predetermined wavelength to the EDF. By preliminarily setting the wavelength of the pump light within a 0.98 $\mu$m band or a 1.48 $\mu$m band, a gain band including a wavelength of 1.55 $\mu$m can be obtained.

Further, another type of the optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. At a receiving end, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

In the case of combining WDM and an optical amplifier to construct a system, a transmission distance is limited by the gain characteristic (gain dependence on wavelength characteristic) of the optical amplifier, which is represented by a gain deviation or gain tilt. For example, in an EDFA, a gain tilt is generated at wavelengths near 1.55 $\mu$m. If the gain deviation is accumulated in a chain of plural cascaded EDFAs, an optical SNR (signal-to-noise ratio) in a channel included in a small-gain band is deteriorated, for example.

The optical amplifying medium containing a rare earth (element) as a dopant is classified into a silica fiber obtained by doping a rare earth in silica glass having a primary component similar to that of a transmission fiber and a nonsilica fiber obtained by doping a rare earth in nonsilica glass such as fluoride glass and tellurite glass. The silica fiber has an advantage such that it is easy to handle, but has an intrinsic problem such that a relatively large gain deviation tends to be generated. In contrast, the nonsilica fiber has an advantage such that a gain deviation is hardly generated, but has a disadvantage such that it is not easy to handle. In a fluoride glass fiber, for example, it has a low melting point, and fusion splicing to a silica fiber is therefore difficult. Furthermore, the mechanical strength of the fluoride glass fiber is low, so that its reliability related to a breakage life or the like is low. In addition, since the fluoride glass fiber has a deliquescent property, an advanced packaging technique is required.

Further, generally in a rare earth doped silica fiber or nonsilica fiber, the mode field diameter (MFD) of these fibers is set smaller than that of a transmission fiber, so as to increase a pumping efficiency. Accordingly, it is sometimes difficult to effectively supply to the fiber a pump light beam for pumping the fiber, resulting in a reduction in pumping efficiency.

SUMMARY OF THE INVENTION

It is therefore an object of the present invention to provide an optical amplifier reduced in gain deviation and improved in reliability or to provide a fiber module applicable to the optical amplifier.

It is another object of the present invention to improve the reliability of an optical amplifier having a rare earth doped nonsilica fiber.

It is still another object of the present invention to provide an optical amplifier improved in pumping efficiency by a pump light beam or to provide a fiber module applicable to the optical amplifier.

It is a further object of the present invention to provide an apparatus usable as a white light source by the optical amplifier according to the present invention.

In accordance with an aspect of the present invention, there is provided an optical amplifier comprising a rare earth doped nonsilica fiber, a fiber holder, a sealing means, an optical means, and a pumping means. The fiber holder has a first end portion, a second end portion, and a hole extending between the first end portion and the second end portion. The nonsilica fiber is inserted and fixed in the hole of the fiber holder. The sealing means hermetically seals the first end portion and the second end portion of the fiber holder. The optical means is optically connected to the first end portion and the second end portion of the fiber holder so that signal light to be amplified propagates in the nonsilica fiber. The pumping means pumps the nonsilica fiber so that the nonsilica fiber provides a gain band including the wavelength of the signal light.

In this optical amplifier, the nonsilica fiber is adopted as an optical amplifying medium to thereby allow a reduction in gain deviation. Since the nonsilica fiber is inserted and fixed in the hole of the fiber holder, breakage of the nonsilica fiber can be suppressed to improve the reliability. Since both the first end portion and the second end portion of the fiber holder are hermetically sealed by the sealing means, the nonsilica fiber can be cut off from the outside air to thereby prevent a deterioration in quality of the nonsilica fiber due to moisture absorption or the like.

For example, the sealing means may be provided by antireflection films formed on the first end portion and the second end portion of the fiber holder so as to cover end faces of the nonsilica fiber. In this case, the nonsilica fiber, and the pumping means can be optically connected by spatial coupling using a lens. Further, the nonsilica fiber and a signal light input port and a signal light output port each provided by a fiber collimator can be optically connected by spatial coupling using a lens.

In accordance with another aspect of the present invention, there is provided an optical amplifier comprising first and second optical waveguide structures each doped with a rare earth, first and second lenses, first and second pump light sources, and a reflector. The first optical waveguide structure has a first end and a second end. The second optical waveguide structure has a third end and a fourth end respectively corresponding to the first end and the second end. The first lens is opposed to the first end and the third end. The second lens is opposed to the second end and the fourth end. The first and second pump light sources output first and second pump light beams, respectively. The reflector is provided near a focal point of the second lens. The reflector couples the second end of the first optical waveguide structure and the fourth end of the second optical waveguide structure by reflection of signal light. The first pump light beam is supplied through the reflector and the second lens to the second end of the first optical waveguide structure. The second pump light beam is supplied through the reflector and the second lens to the fourth end of the second optical waveguide structure. The first end of the first optical waveguide structure and the third end of the second optical waveguide structure are coupled through the first lens to an input port and an output port of the signal light, respectively.

With this configuration, regarding the total length of the first and second optical waveguide structures as one optical amplifying medium, the first and second pump light beams can be supplied into this optical amplifying medium from its substantially central position in opposite directions, thereby providing an optical amplifier having a high pumping efficiency.

In accordance with a still another aspect of the present invention, there is provided a fiber module for optical amplification comprising a nonsilica fiber doped with a rare earth element, a fiber holder having a first end portion, a second end portion, and a hole extending between the first end portion and the second end portion, the nonsilica fiber being inserted and fixed in the hole of the fiber holder, and a sealing means for hermetically sealing the first end portion and the second end portion of the fiber holder.

In accordance with a further aspect of the present invention, there is provided a fiber module for optical amplification comprising a nonsilica fiber doped with a rare earth element, a fiber holder having a first end portion, a second end portion, and a hole extending between the first end portion and the second end portion, the nonsilica fiber being inserted and fixed in the hole of the fiber holder, first and second lenses respectively opposed to the first end portion and the second end portion of the fiber holder, a first sleeve in which the first lens and the first end portion of the fiber holder are inserted, and a second sleeve in which the second lens and the second end portion of the fiber holder are inserted.

In accordance with a still further aspect of the present invention, there is provided an apparatus comprising a nonsilica fiber doped with a rare earth element, a fiber holder having a first end portion, a second end portion, and a hole extending between the first end portion and the second end portion, the nonsilica fiber being inserted and fixed in the hole of the fiber holder, a sealing means for hermetically sealing the first end portion and the second end portion of the fiber holder, and a means for pumping the nonsilica fiber so that the nonsilica fiber provides a gain band. This apparatus is used as a white light source.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
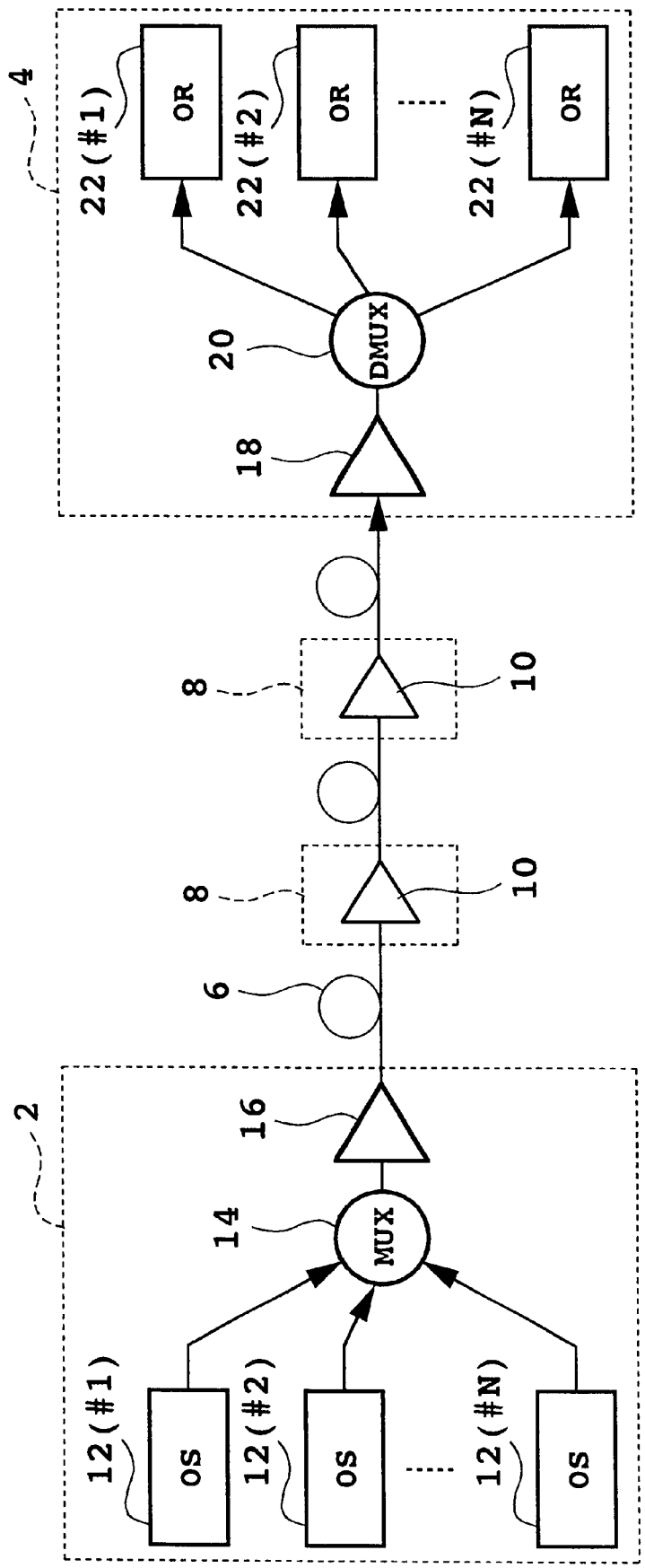
FIG. 1 is a block diagram showing an optical fiber communication system to which the present invention is applicable.

Referring to FIG. 1, there is shown an optical fiber communication system to which the present invention is applicable. This system includes a first terminal device 2, a second terminal device 4, an optical fiber transmission line 6 connecting the terminal devices 2 and 4, and a plurality of (e.g., two as shown) optical repeaters 8 arranged along the optical fiber transmission line 6. Each optical repeater 8 includes an optical amplifier 10.

The first terminal device 2 includes a plurality of optical transmitters (OS) 12 (#1 to #N) for outputting a plurality of optical signals having different wavelengths, an optical multiplexer (MUX) 14 for wavelength division multiplexing these optical signals to output resultant WDM signal light, and an optical amplifier 16 for amplifying the WDM signal light to deliver it into the optical fiber transmission line 6.

The second terminal device 4 includes an optical amplifier 18 for amplifying the WDM signal light transmitted by the optical fiber transmission line 6, an optical demultiplexer (DMUX) 20 for separating the WDM signal light amplified by the optical amplifier 18 into a plurality of optical signals, and a plurality of optical receivers (OR) 22 (#1 to #N) for receiving these optical signals.

According to this system, the loss of the WDM signal light can be compensated by the optical amplifiers 10, 16, and 18, thereby allowing long-haul transmission. Further, since WDM is applied to each of the terminal devices 2 and 4, a transmission capacity of the optical fiber transmission line 6 can be increased according to the number of WDM channels, N.

The plural optical repeaters 8 may be replaced by a single similar optical repeater 8. Further, the optical amplifier 16 as a postamplifier or the optical amplifier 18 as a preamplifier may be omitted.

Figure 2A:
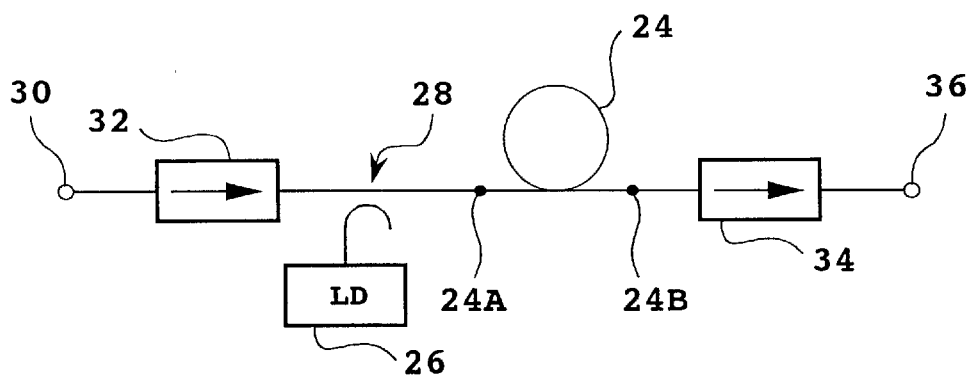
FIGS. 2A, 2B, and 2C are diagrams showing a related art optical amplifiers each having a silica fiber as an optical amplifying medium.
Figure 2B:
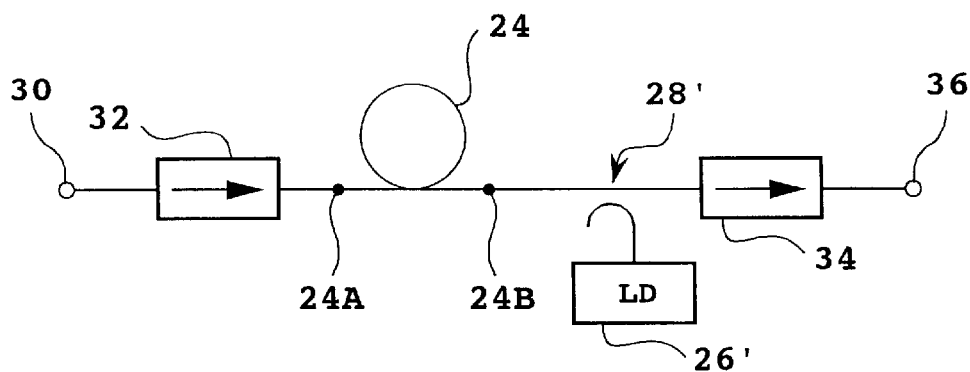
Figure 2C:
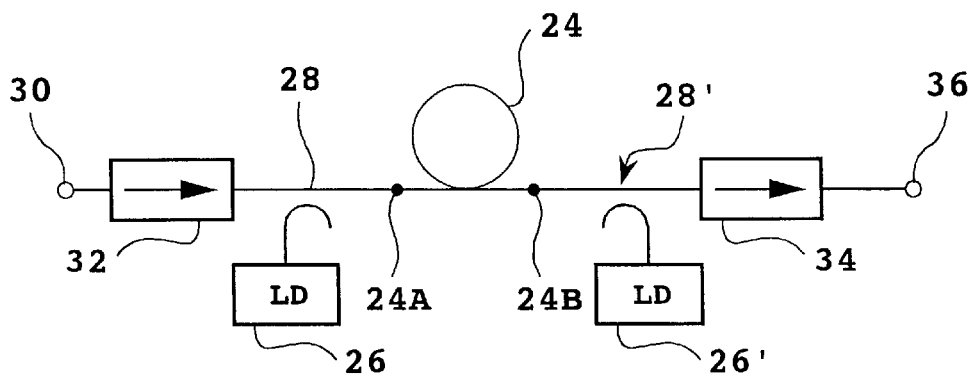

FIGS. 2A, 2B, and 2C show different types of optical amplifiers proposed in the related art to be used as each of the optical amplifiers 10, 16, and 18.

The optical amplifier shown in FIG. 2A has a doped fiber 24 obtained by doping a silica fiber (silica glass fiber) with Er (erbium), as an optical amplifying medium.

A pump light beam output from a laser diode (LD) 26 is supplied through a WDM coupler 28 into the doped fiber 24 from its first end 24A. Signal light to be amplified is input to an input port 30 and supplied through an optical isolator 32 and the WDM coupler 28 into the doped fiber 24 from its first end 24A. When the signal light is supplied to the doped fiber 24 being pumped by the pump light beam, the signal light is amplified in accordance with the principle of stimulated emission, and amplified signal light is then passed through a second end 24B of the doped fiber 24 and an optical isolator 34 and finally output from an output port 36. In this optical amplifier, the pump light beam and the signal light to be amplified propagate in the doped fiber 24 in the same direction. Therefore, this type of optical amplifier is called as a forward pumping type.

In the optical amplifier shown in FIG. 2B, a WDM coupler 28' is provided between the second end 24B of the doped fiber 24 and the optical isolator 34, and a pump light beam output from a laser diode 26' is supplied through the WDM coupler 28' into the doped fiber 24 from its second end 24B. In this optical amplifier, the signal light and the pump light beam propagate in the doped fiber 24 in opposite directions. Therefore, this type of optical amplifier is called as a backward pumping type.

The optical amplifier shown in FIG. 2C is of a bidirectional pumping type obtained by combining the forward pumping type and the backward pumping type. A first pump light beam output from the laser diode 26 is supplied through the WDM coupler 28 into the doped fiber 24 from its first end 24A, and a second pump light beam output from the laser diode 26' is supplied through the WDM coupler 28' into the doped fiber 24 from its second end 24B.

Each of the optical amplifiers shown in FIGS. 2A, 2B, and 2C has a problem such that a large gain deviation occurs as hereinafter described because the base material of the doped fiber 24 is silica glass. To reduce a gain deviation or obtain a required amplification characteristic, it has been proposed to use a nonsilica fiber doped with a rare earth. An example of such an optical amplifier is shown in FIG. 3.

Figure 3:
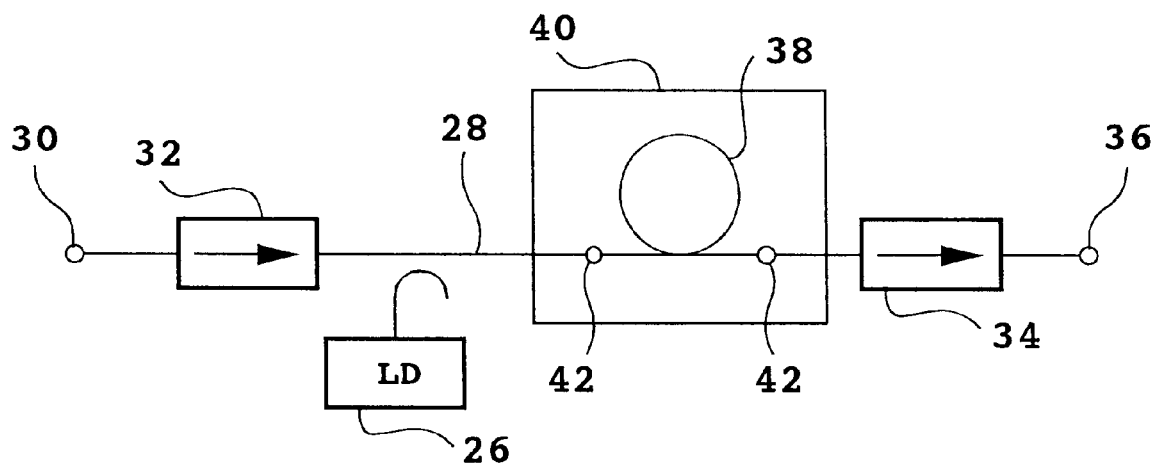
FIG. 3 is a diagram showing a related art optical amplifier having a nonsilica fiber as an optical amplifying medium.

The optical amplifier shown in FIG. 3 has a doped fiber 38 as an optical amplifying medium. The doped fiber 38 is a nonsilica fiber, e.g., a fluoride glass fiber, doped with Er (erbium). This optical amplifier is of a forward pumping type similar to that shown in FIG. 2A.

The doped fiber 38 is hermetically sealed in a package 40, for example, because the nonsilica fiber is physically or chemically more unstable than the silica fiber in many cases. Further, in contrast to the optical amplifier shown in FIG. 2A wherein splicing can be applied to the opposite ends 24A and 24B of the doped fiber 24, the optical amplifier shown in FIG. 3 has a disadvantage such that it is difficult to apply splicing to the opposite ends of the doped fiber 38 for the above-mentioned reason, so that two optical coupling members 42 are provided for the doped fiber 38. Each optical coupling member 42 may be provided by butt joint of fiber ends within a V-groove, for example.

The optical amplifier shown in FIG. 3 has a possibility that a gain deviation can be reduced. However, its reliability is low because of the intrinsic physical or chemical instability of the doped fiber 38.

Figure 4:
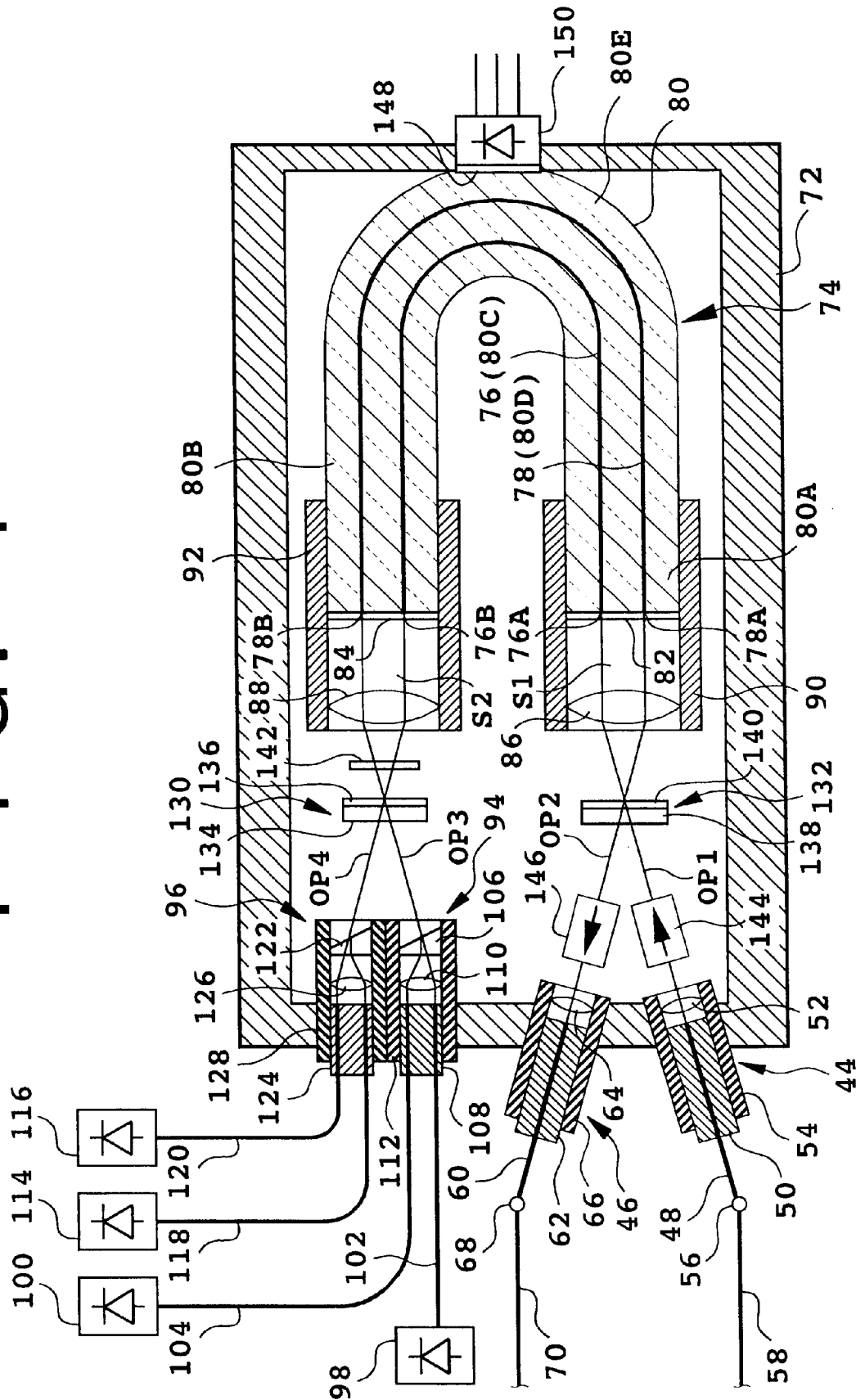
FIG. 4 is a sectional view showing a preferred embodiment of the optical amplifier according to the present invention.

FIG. 4 is a sectional view showing a preferred embodiment of the optical amplifier according to the present invention. This optical amplifier is usable as each of the optical amplifiers 10, 16, and 18 shown in FIG. 1. This optical amplifier has an input fiber collimator 44 and an output fiber collimator 46 respectively functioning as an input port for signal light to be amplified and an output port for amplified signal light.

The input fiber collimator 44 is composed of an interface fiber 48, a ferrule 50 in which the fiber 48 is inserted and fixed, a lens 52 for collimating signal light to be amplified, output from the fiber 48 and outputting the signal light as a substantially parallel beam, and a sleeve 54 in which the ferrule 50 and the lens 52 are inserted and fixed. The interface fiber 48 is optically connected at a fusion splicing point 56 to an optical fiber 58 related to the optical fiber transmission line 6 (see FIG. 1).

The output fiber collimator 46 is composed of an interface fiber 60, a ferrule 62 in which the fiber 60 is inserted and fixed, a lens 64 for converging amplified signal light provided thereto as a substantially parallel beam and making it enter the fiber 60, and a sleeve 66 in which the ferrule 62 and the lens 64 are inserted and fixed. The interface fiber 60 is optically connected at a fusion splicing point 68 to an optical fiber 70 related to the optical fiber transmission line 6.

Each of the optical fibers 58 and 70 is provided by a single-mode silica fiber having a mode field diameter (MFD) of about 10 $\mu$m, and each of the interface fibers 48 and 60 is provided by a high NA (numerical aperture) silica fiber having an MFD of about 4 $\mu$m. MFD conversion is effected by thermal diffusion in the fiber core at each of the fusion splicing points 56 and 68.

The reason for using the interface fibers 48 and 60 each having a relatively small MFD is to reduce the sizes of the lenses 52 and 64 or to increase the degree of freedom of design of the fiber collimators 44 and 46. Accordingly, in the case that these requirements are not important, the optical fibers 58 and 70 may be directly inserted and fixed in the ferrules 50 and 62, respectively.

The fiber collimators 44 and 46 are fixed to a housing 72. A fiber module 74 optically connected to the fiber collimators 44 and 46 is fixed in the housing 72. Accordingly, a relative positional relation between the fiber collimators 44 and 46 and the fiber module 74 is determined, and the optical connection therebetween is stably maintained.

The fiber module 74 includes doped fibers 76 and 78 each provided by an Er doped fluoride glass fiber, and a fiber holder 80 provided by a glass pipe. The fiber holder 80 has a first end portion 80A, a second end portion 80B, and a pair of holes 80C and 80D extending between the end portions 80A and 80B. The doped fiber 76 has a first end 76A and a second end 76B, and the doped fiber 78 has a third end 78A and a fourth end 78B. The doped fiber 76 is inserted and fixed in the hole 80C so that the first end 76A and the second end 76B respectively correspond to the first end portion 80A and the second end portion 80B, and the doped fiber 78 is inserted and fixed in the hole 80D so that the third end 78A and the fourth end 78B respectively correspond to the first end portion 80A and the second end portion 80B. More specifically, the first end 76A, the third end 78A, and the end face of the first end portion 80A of the fiber holder 80 are flush with each other. Similarly, the second end 76B, the fourth end 78B, and the end face of the second end portion 80B of the fiber holder 80 are also flush with each other.

Antireflection films 82 and 84 are formed on the end faces of the first end portion 80A and the second end portion 80B of the fiber holder 80, respectively. Each of the antireflection films 82 and 84 may be provided by a multilayer dielectric film, for example. The first end 76A of the doped fiber 76 and the third end 78A of the doped fiber 78 are airtightly covered with the antireflection film 82 to prevent exposure of the first end 76A and the third end 78A to the outside air. Similarly, the second end 76B of the doped fiber 76 and the fourth end 78B of the doped fiber 78 are airtightly covered with the antireflection film 84 to prevent exposure of the second end 76B and the fourth end 78B to the outside air.

In this preferred embodiment, the fiber module 74 further includes lenses 86 and 88 respectively opposed to the first end portion 80A and the second end portion 80B of the fiber holder 80, a sleeve 90 in which the lens 86 and the first end portion 80A are inserted and fixed, and a sleeve 92 in which the lens 88 and the second end portion 80B are inserted and fixed.

The structure of the fiber module 74 (e.g., the distance between the lens 86 and the first end portion 80A, and the distance between the doped fibers 76 and 78) and the relative positional relation between the fiber module 74 and the fiber collimators 44 and 46 are set so that the input fiber collimator 44 and the first end 76A of the doped fiber 76 are optically connected by an optical path OP1 related to the signal light to be amplified and that the third end 78A of the doped fiber 78 and the output fiber collimator 46 are optically connected by an optical path OP2 related to the amplified signal light.

The doped fibers 76 and 78 are pumped so as to provide a gain band including the wavelength of the signal light. To this end, this preferred embodiment employs a first pumping unit 94 for outputting a first pump light beam to an optical path OP3 and a second pumping unit 96 for outputting a second pump light beam to an optical path OP4.

The first pumping unit 94 includes laser diodes 98 and 100 for respectively outputting first and second polarization beams having polarization planes orthogonal to each other, polarization maintaining fibers (PMF) 102 and 104 for respectively transmitting the first and second polarization beams as maintaining their polarization planes, and a polarization beam combiner 106 for combining the first and second polarization beams respectively output from the fibers 102 and 104 and outputting the resultant first pump light beam. The polarization beam combiner 106 may be provided by a birefringent prism exhibiting different refractive indices, or refraction angles with respect to its ordinary ray and extraordinary ray.

The polarization maintaining fibers (PMF) 102 and 104 are inserted and fixed in a ferrule 108 in such a manner that end portions of the fibers 102 and 104 are substantially parallel to each other. The ferrule 108, a lens 110, and the combiner 106 are fixed in a holder 112 fixed to the housing 72. The first and second polarization beams respectively output from the polarization maintaining fibers 102 and 104 respectively correspond to the ordinary ray and the extraordinary ray in the birefringent prism as the combiner 106, for example. The first and second polarization beams respectively output from the fibers 102 and 104 are collimated by the lens 110 to become parallel beams, which are next combined by the combiner 106 to follow the same optical path (the optical path OP3).

The second pumping unit 96 includes laser diodes 114 and 116 for respectively outputting third and fourth polarization beams having polarization planes orthogonal to each other, polarization maintaining fibers (PMF) 118 and 120 for respectively transmitting the third and fourth polarization beams as maintaining their polarization planes, and a polarization beam combiner 122 for combining the third and fourth polarization beams respectively output from the fibers 118 and 120 and outputting the resultant second pump light beam. The polarization beam combiner 122 may be provided by a birefringent prism exhibiting different refractive indices, or refraction angles with respect to its ordinary ray and extraordinary ray.

The polarization maintaining fibers 118 and 120 are inserted and fixed in a ferrule 124 in such a manner that end portions of the fibers 118 and 120 are substantially parallel to each other. The ferrule 124, a lens 126, and the combiner 122 are fixed in a holder 128 fixed to the housing 72. The third and fourth polarization beams respectively output from the polarization maintaining fibers 118 and 120 respectively correspond to the ordinary ray and the extraordinary ray in the birefringent prism as the combiner 122, for example. The third and fourth polarization beams respectively output from the fibers 118 and 120 are collimated by the lens 126 to become parallel beams, which are next combined by the combiner 122 to follow the same optical path (the optical path OP4).

The structure of the fiber module 74 (e.g., the distance between the lens 88 and the second end portion 80B, and the distance between the doped fibers 76 and 78) and the relative positional relation between the fiber module 74 and the pumping units 94 and 96 are set so that the first pumping unit 94 and the fourth end 78B of the doped fiber 78 are optically connected by the optical path OP3, and that the second pumping unit 96 and the second end 76B of the doped fiber 76 are optically connected by the optical path OP4.

A first reflector 130 is provided between the lens 88 and the pumping units 94 and 96. An optical path of reflected light is provided by the reflector 130 and the lens 88. Concerning the signal light, the second end 76B of the doped fiber 76 and the fourth end 78B of the doped fiber 78 are optically coupled by this optical path of reflected light.

In this preferred embodiment, the reflector 130 is provided by an optical filter composed of a glass substrate 134 and a filter film 136 such as a multilayer dielectric film formed on the glass substrate 134. The reflector 130 can be located so as to intersect the optical paths OP3 and OP4 by making the reflector 130 reflect the signal light and transmit the first and second pump light beams.

A second reflector 132 is provided between the lens 86 and the fiber collimators 44 and 46. The reflector 132 is provided by an optical filter composed of a glass substrate 138 and a filter film 140 such as a multilayer dielectric film formed on the glass substrate 138. The reflector 132 can be located so as to intersect the optical paths OP1 and OP2 by making the reflector 132 transmit the signal light and reflect the first and second pump light beams.

Particularly in the case that each of the first and second pump light beams has a wavelength shorter than the wavelength of the signal light, the reflectors 130 and 132 may be provided by a short-wave pass filter and a long-wave pass filter, respectively.

Another optical path of reflected light is provided by the reflector 132 and the lens 86. Concerning the first and second pump light beams, the first end 76A of the doped fiber 76 and the third end 78A of the doped fiber 78 are optically coupled by this optical path of reflected light.

An optical filter 142 made of such as an etalon plate is provided between the first reflector 130 and the lens 88 so as to intersect the optical paths OP3 and OP4. The function of the optical filter 142 will be hereinafter described.

An optical isolator 144 is provided between the input fiber collimator 44 and the reflector 132 to allow one-way pass of the signal light to be amplified, output from the fiber collimator 44. Further, an optical isolator 146 is provided between the reflector 132 and the output fiber collimator 46 to allow one-way pass of the amplified signal light transmitted by the reflector 132.

In this preferred embodiment, the fiber holder 80 has a curved portion 80E. The fiber holder 80 is bent substantially 180° at the curved portion 80E, so that the fiber holder 80 has a U-shaped configuration. A photodetector 150 is provided outside of the curved portion 80E of the fiber holder 80 to receive leaky mode light from the doped fiber 76 or 78 through an optical filter 148. The photodetector 150 may be provided by a photodiode such as an avalanche photodiode.

In this preferred embodiment, at least a part of the doped fiber 76 near the first end 76A and the second end 76B is substantially parallel to the doped fiber 78. Accordingly, the optical path of reflected light by the reflector 130 and the lens 88 concerning the signal light can be easily provided by locating the reflector 130 (more accurately, the filter film 136) near the focal point of the lens 88. Similarly, the optical path of reflected light by the reflector 132 and the lens 86 concerning the first and second pump light beams can be easily provided by locating the reflector 132 (more accurately, the filter film 140) near the focal point of the lens 86.

The first pump light beam supplied along the optical path OP3 into the doped fiber 78 from its fourth end 78B pumps the doped fiber 78 during propagation in the doped fiber 78, and a remained part of the first pump light beam after this pumping is output from the third end 78A. The remaining first pump light beam output from the third end 78A is collimated by the lens 86 to become a parallel beam, which is in turn reflected by the reflector 132. The reflected beam from the reflector 132 is converged by the lens 86 to enter the doped fiber 76 from its first end 76A, thereby pumping the doped fiber 76.

The second pump light beam supplied along the optical path OP4 into the doped fiber 76 from its second end 76B pumps the doped fiber 76 during propagation in the doped fiber 76, and a remained part of the second pump light beam after this pumping is output from the first end 76A. The remaining second pump light beam output from the first end 76A is collimated by the lens 86 to become a parallel beam, which is in turn reflected by the reflector 132. The reflected beam from the reflector 132 is converged by the lens 86 to enter the doped fiber 78 from its third end 78A, thereby pumping the doped fiber 78.

When the signal light is supplied along the optical path OP1 into the doped fiber 76 from its first end 76A, the signal light is amplified in the doped fiber 76 during propagation therein, and the amplified signal light is output from the second end 76B. The amplified signal light output from the second end 76B is collimated by the lens 88 to become a parallel beam, which is in turn reflected by the reflector 130. The reflected beam from the reflector 130 is converged by the lens 88 to enter the doped fiber 78 from its fourth end 78B. The signal light entered the doped fiber 78 is further amplified in the doped fiber 78 during propagation therein, and the further amplified signal light is output from the third end 78A. The signal light output from the third end 78A is supplied along the optical path OP2 to the output fiber collimator 46.

Figure 5:
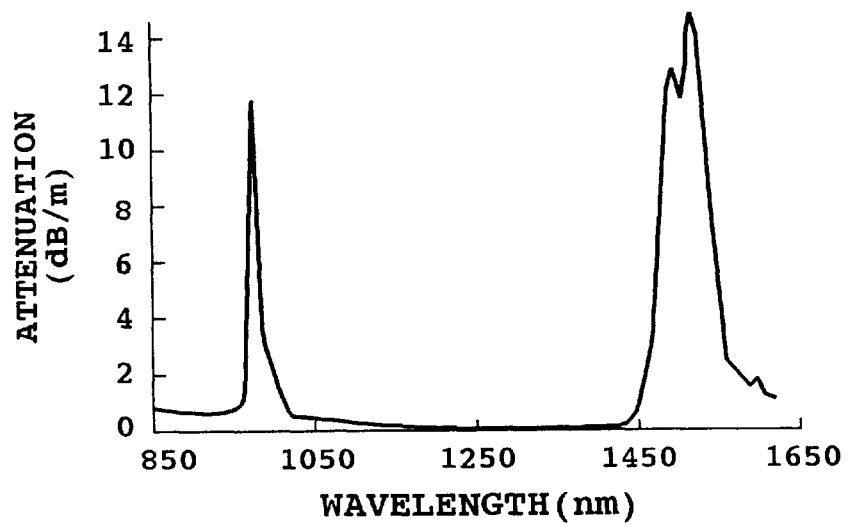
FIG. 5 is a graph showing an example of an absorption characteristic of a fluoride glass fiber.

Referring to FIG. 5, there is shown an example of an absorption characteristic of an Er doped fluoride glass fiber. In FIG. 5, the vertical axis represents attenuation (dB/m), and the horizontal axis represents wavelength (nm). In this example, three absorption peaks are generated near 980 nm, 1480 nm, and 1530 nm. Accordingly, in the case that each of the doped fibers 76 and 78 shown in FIG. 4 has an absorption characteristic as shown in FIG. 5, the doped fibers 76 and 78 can be effectively pumped by setting the wavelength of each of the first and second pump light beams to a 0.98 $\mu$m band (0.96–1.00 $\mu$m), 1.48 $\mu$m band (1.46–1.50 $\mu$m), or 1.53 $\mu$m band (1.51–1.55 $\mu$m). The wavelengths of the first and second pump light beams may be included in the same pump band (e.g., 0.98 $\mu$m band) or may be set to different pump bands (e.g., 0.98 $\mu$m band and 1.48 $\mu$m band).

Figure 6:
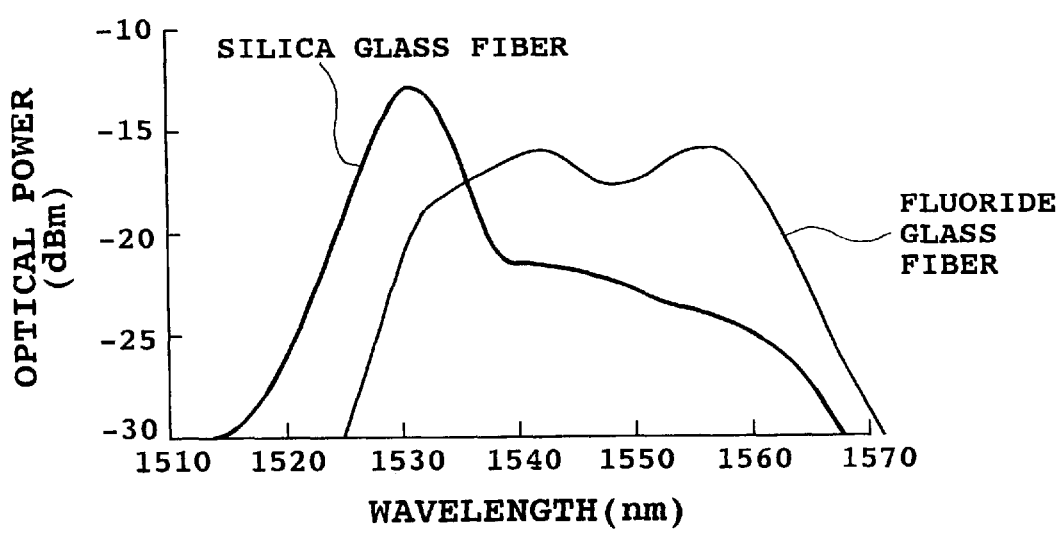
FIG. 6 is a graph showing an example of emission characteristics of a silica glass fiber and a fluoride glass fiber.

Referring to FIG. 6, there is shown an example of emission characteristics of an Er doped silica glass fiber and an Er doped fluoride glass fiber. In FIG. 6, the vertical axis represents optical power (dBm), and the horizontal axis represents wavelength (nm). The emission characteristics shown in FIG. 6 are ASE (amplified spontaneous emission) spectra when pumping these fibers at a 0.98 $\mu$m band or a 1.48 $\mu$m band. A spectrum of ASE reflects a gain characteristic with respect to a small signal, so that each ASE spectrum shown in FIG. 6 corresponds to a wavelength characteristic of gain. In the silica glass fiber, a gain deviation of 10 dB or more is generated in a wavelength band ranging from 1530 nm to 1560 nm, whereas in the fluoride glass fiber a gain deviation of only several dB is generated in the same band.

Figure 7:
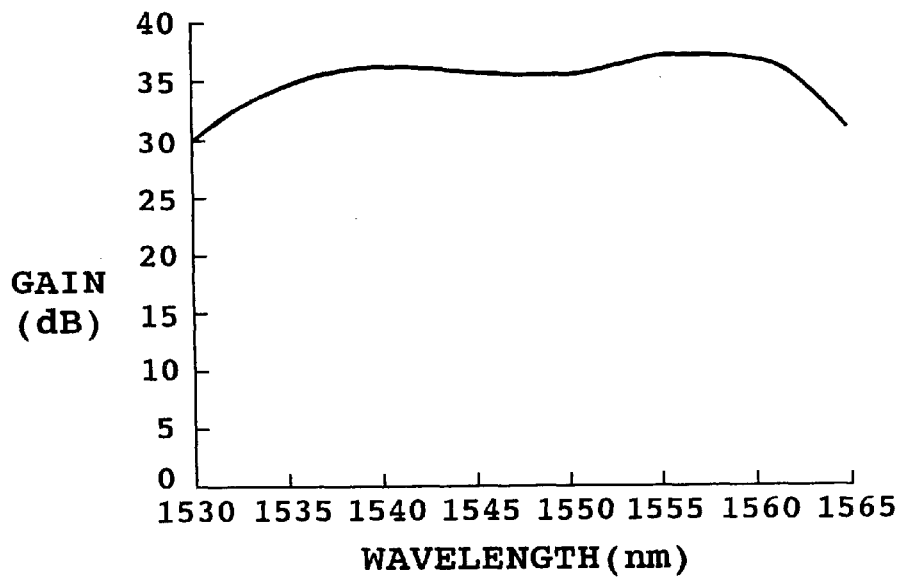
FIG. 7 is a graph showing an example of a gain characteristic with respect to a small signal in the case of using a fluoride glass fiber.

Referring to FIG. 7, there is shown an example of the gain characteristic with respect to a small signal in the case of using an Er doped fluoride glass fiber. In FIG. 7, the vertical axis represents gain (dB), and the horizontal axis represents wavelength (nm). As apparent from FIG. 7, a relatively flat gain characteristic is obtained in a wavelength band ranging from 1530 nm to 1565 nm.

In the preferred embodiment shown in FIG. 4, each of the doped fibers 76 and 78 may be provided by an Er doped fluoride glass fiber as an optical amplifying medium, so that the gain deviation in the optical amplifying medium can be suppressed. Accordingly, by using this optical amplifier as each or any one of the optical amplifiers 10, 16, and 18, a limitation in transmission distance due to the gain deviation can be relaxed.

The present inventors' knowledge shows that the product of an optimum fiber length (unit: m) and an Er doping concentration (unit: ppm) to obtain a gain of 30 dB to 40 dB by using an Er doped silica fiber or an Er doped nonsilica fiber is empirically about 10,000. For example, in the case that the Er doping concentration is 1,000 ppm, the optimum fiber length is 10 m.

In an Er doped silica fiber, there is a case that if the Er doping concentration is increased, a required gain cannot be obtained because of concentration quenching caused by crystallization or colloidization of an Er compound. In this point of view, the Er doping concentration in an Er doped silica fiber is set in a proper range of 300 ppm to 1,000 ppm. Accordingly, the fiber length must be set to several meters or more to obtain a required gain. Thus, there is a limit in size reduction of an optical amplifier using an Er doped silica fiber as an optical amplifying medium.

To the contrary, an Er doped nonsilica fiber less exhibits concentration quenching, so that it is possible to increase the Er doping concentration and thereby shortening the Er doped nonsilica fiber to such an extent that an optical amplifier can be reduced in size. For example, by setting the Er doping concentration in a fluoride glass fiber to 50,000 ppm or more, the fiber length can be reduced in size sufficiently for practical use (e.g., 20 cm according to the above-mentioned empirical rule). Particularly in the preferred embodiment shown in FIG. 4, the two doped fibers 76 and 78 inserted and fixed in the fiber holder 80 can be effectively subjected to optical amplification, so that the length of the fiber module 74 can be greatly reduced to about 10 cm, thus allowing the size reduction of an optical amplifier.

Since the doped fibers 76 and 78 can be shortened as mentioned above, the fiber holder 80 ensuring airtightness without an increase in size can be used to hermetically seal the doped fibers 76 and 78. That is, as in the preferred embodiment shown in FIG. 4, hermetic seal of the holes 80C and 80D of the fiber holder 80 can be easily effected only by forming the antireflection films 82 and 84 at the opposite ends of the fiber holder 80, thus preventing exposure of the doped fibers 76 and 78 to the outside air. As a result, the doped fibers 76 and 78 can be made physically or chemically stable to thereby improve the reliability of the optical amplifier.

By forming the antireflection films 82 and 84 at the opposite ends of the fiber holder 80, Fresnel reflection losses at the first to fourth ends 76A, 76B, 78A, and 78B of the doped fibers 76 and 78 can be reduced. This object may be achieved by polishing each end face of the fiber holder 80 with an inclination angle of about 12°.

By using the common lens 86 for optically connecting the fiber module 74 and the fiber collimators 44 and 46, the number of optical components required can be reduced to thereby simplify the configuration of the optical amplifier. Further, since the lens 86 is fixed through the sleeve 90 to the first end portion 80A of the fiber holder 80, a space S1 defined by the lens 86, the sleeve 90, and the fiber holder 80 can be cut off from the outside air, thereby improving the hermetic sealability of the first end 76A of the doped fiber 76 and the third end 78A of the doped fiber 78. In particular, by evacuating the space S1 or filling it with an inert gas such as nitrogen gas and argon gas, the physical or chemical stability of the doped fibers 76 and 78 can be sufficiently ensured without the antireflection film 82.

The common lens 88 is used to supply the first pump light beam output from the first pumping unit 94 to the fourth end 78B of the doped fiber 78 and to supply the second pump light beam output from the second pumping unit 96 to the second end 76B of the doped fiber 76. Accordingly, the number of optical components required can be reduced to thereby simplify the configuration of the optical amplifier.

Since the lens 88 is fixed through the sleeve 92 to the second end portion 80B of the fiber holder 80, a space S2 defined by the lens 88, the sleeve 92, and the fiber holder 80 can be cut off from the outside air, thereby improving the hermetic sealability of the second end 76B of the doped fiber 76 and the fourth end 78B of the doped fiber 78. In particular, by evacuating the space S2 or filling it with an inert gas such as nitrogen gas and argon gas, the physical or chemical stability of the doped fibers 76 and 78 can be sufficiently ensured without the antireflection film 84.

In the case that the fiber holder 80 has the curved portion 80E as shown in FIG. 4, the fiber module 74 can be easily manufactured by making a part of the doped fiber 76 near the first end 76A and the second end 76B substantially parallel to the doped fiber 78. Similarly, also in the case that the fiber holder 80 has no curved portion although not shown, the fiber module 74 can be easily manufactured by arranging the doped fibers 76 and 78 substantially parallel to each other.

The lenses 86 and 88 and the reflector 130 are used to supply the signal light to be amplified, output from the input fiber collimator 44 to the fiber module 74, propagate the signal light in the doped fibers 76 and 78, and supply the signal light amplified in the fiber module 74 to the output fiber collimator 46. Accordingly, losses caused from the input fiber collimator 44 to the output fiber collimator 46 can be suppressed at a minimum to thereby provide a high-performance optical amplifier.

Generally in a rare earth doped silica fiber or a rare earth doped nonsilica fiber, the MFD (mode field diameter) is set to about 3 to 5 $\mu$m, so as to increase pump light power per unit cross section and thereby improving a pumping efficiency.

In the preferred embodiment shown in FIG. 4, the interface fiber 48 and the lenses 52 and 86 are used to match the MFD of the input optical fiber 58 and the MFD of the doped fiber 76. Similarly, the interface fiber 60 and the lenses 64 and 86 are used to match the MFD of the output optical fiber 70 and the MFD of the doped fiber 78. Accordingly, losses caused in an optical path extending from the optical fiber 58 to the optical fiber 70 can be suppressed at a minimum. As a result, in the case of applying this optical amplifier to the system shown in FIG. 1, the consistency between the optical fiber transmission line 6 and this optical amplifier can be improved.

The first pumping unit 94 for supplying the first pump light beam into the doped fiber 78 from its fourth end 78B and the second pumping unit 96 for supplying the second pump light beam into the doped fiber 76 from its second end 76B are used to pump the doped fibers 76 and 78. Accordingly, the first and second pump light beams are supplied into the fiber module 74 at a substantially central point of the total length of the doped fibers 76 and 78. More specifically, the first pump light beam propagates in the doped fiber 78 in the same direction as the propagation direction of the signal light, and the second pump light beam propagates in the doped fiber 76 in the direction opposite to the propagation direction of the signal light. Accordingly, the first and second pump light beams can be effectively used to thereby improve a pumping efficiency, thus providing a high-performance optical amplifier.

Particularly in the preferred embodiment shown in FIG. 4, the remained first pump light beam after pumping the doped fiber 78 is reflected by the reflector 132 and supplied to the doped fiber 76. Similarly, the remained second pump light beam after pumping the doped fiber 76 is reflected by the reflector 132 and supplied into the doped fiber 78. Accordingly, the pumping efficiency can be further improved to thereby provide a higher-performance optical amplifier.

In the case that the reflector 130 is provided by a first optical filter for reflecting the signal light and transmitting the first and second pump light beams, the first optical filter can be located between the lens 88 and the pumping units 94 and 96, thereby allowing size reduction of the optical amplifier. Furthermore, in the case that the reflector 132 is provided by a second optical filter for transmitting the signal light and reflecting the first and second pump light beams, the second optical filter can be located between the lens 86 and the fiber collimators 44 and 46, thereby allowing size reduction of the optical amplifier.

Particularly in the case that each of the first and second pump light beams has a wavelength shorter than the wavelength of the signal light as in the case that the wavelength of the signal light falls in the range of 1525 nm to 1565 nm and the wavelength of each of the first and second pump light beams falls in a 0.98 μm band or 1.48 μm band, the first and second optical filters can be simply provided by a short-wave pass filter and a long-wave pass filter, respectively, thereby allowing easy manufacture of the optical amplifier.

Since the fiber collimator 44 is used as an input port for the signal light to optically connect the fiber collimator 44 and the fiber module 74 through the optical path OP1 formed by a parallel beam, the optical isolator 144 provided along the optical path OP1 can be replaced by a part of a polarization-independent optical isolator. The part may be composed of a pair of birefringent wedge plates and a 45° Faraday rotator located therebetween, for example.

Similarly, since the fiber collimator 46 is used as an output port for the signal light to optically connect the fiber collimator 46 and the fiber module 74 through the optical path OP2 formed by a parallel beam, the optical isolator 146 provided along the optical path OP2 can be replaced by a part of a polarization-independent optical isolator as mentioned above. As a result, the configuration of the optical amplifier can be simplified.

By providing at least one optical isolator along an optical path of signal light as mentioned above, formation of an optical resonator structure including an optical amplifying medium (e.g., the doped fibers 76 and 78 in the preferred embodiment of FIG. 4) can be prevented. Accordingly, an unstable operation of the optical amplifier due to oscillation or the like can be prevented.

In the preferred embodiment shown in FIG. 4, the effect of preventing the unstable operation due to oscillation or the like is obtained also by forming the antireflection films 82 and 84 on the opposite end faces of the fiber holder 80. In the case of optically connecting a rare earth doped nonsilica fiber to a silica fiber related to an optical fiber transmission line, splicing is difficult to apply and it is obliged to apply butt joint of fiber ends, for example, as mentioned previously. In the case of adopting butt joint of fiber ends, it is difficult to sufficiently reduce Fresnel reflection on the fiber end faces, causing easy formation of an optical resonator structure including an optical amplifying medium. According to this preferred embodiment shown in FIG. 4, the fiber module 74 and the fiber collimators 44 and 46 are optically connected by spatial optical coupling using the lens 86, so that the antireflection films 82 and 84 can be applied to prevent the unstable operation due to oscillation or the like. Thus, the combination of the fiber holder 80 for protecting the doped fibers 76 and 78 and the antireflection films 82 and 84 is greatly effective in providing an optical amplifier having a rare earth doped nonsilica fiber as an optical amplifying medium.

Each of the antireflection films 82 and 84 is prepared so as to exhibit a Fresnel reflectance of 0.1% or less, for example.

As the host glass of each of the doped fibers 76 and 78, ZBRAN, a trade name, may be used. For example, the composition of ZBRAN is 53ZrF4-20BaF2-4LaF3-3AlF3-20NaF, and its strength is about $\frac{1}{10}$ of the strength of silica glass.

Since the doped fibers 76 and 78 are protected by the fiber holder 80 in the preferred embodiment shown in FIG. 4, the low strength of each of the doped fibers 76 and 78 is not required to be much considered in practical use. In addition, the fiber module 74 is easy to handle.

The pumping units 94 and 96 are used to pump the doped fibers 76 and 78, and the plural pump light beams are combined in each of the pumping units 94 and 96. Accordingly, pump light power per unit core cross section of each of the doped fibers 76 and 78 can be increased to thereby improve a pumping efficiency. In this case, by using a birefringent prism as each of the polarization beam combiners 106 and 122, the configuration of each of the pumping units 94 and 96 can be simplified.

By additionally providing an element for equalizing gains generated in the fiber module 74, the gain deviation can be further reduced. In the preferred embodiment shown in FIG. 4, this element is provided by the optical filter 142.

Since the optical filter 142 is provided between the reflector 130 and the lens 88, the signal light is passed twice through the optical filter 142. Accordingly, it is sufficient to set a wavelength characteristic of loss substantially a half of the wavelength characteristic of gain to be equalized. For example, in the case of equalizing a gain characteristic as shown in FIG. 7 wherein two gentle gain peaks near 1538 nm and 1558 nm are present, the optical filter 142 having a wavelength characteristic of loss such that the two gain peaks are canceled is used.

In the preferred embodiment shown in FIG. 4, the fiber holder 80 has the curved portion 80E, so that an area for mounting the fiber holder 80 in the housing 72 can be reduced as compared with the case that the fiber holder 80 has no curved portion, thereby allowing size reduction of the optical amplifier.

For example, in the case that the entire length of the fiber holder 80 is about 10 cm as mentioned above, the curved portion 80E is formed so that the radius of curvature of the longitudinally extending center line of the fiber holder 80 is about 30 mm, thereby allowing provision of an optical amplifier sufficiently small in practical use. In this case, the fiber holder 80 has such a shape as to be bent substantially 90° to 180° at the curved portion 80E, so that detectable leaky mode light can be emitted sideward of the fiber from the doped fiber 76 or 78. The leaky mode light can be detected by the photodetector 150, thereby monitoring the pumping power and current gain characteristic and further controlling the operating conditions of the optical amplifier according to a result of this monitoring. The optical filter 148 may be provided by an optical bandpass filter for transmitting a pump light component, signal light component, or ASE component, or a part thereof as required, for example.

By forming the fiber holder 80 of glass and fixing the doped fibers 76 and 78 in the holes 80C and 80D of the fiber holder 80 by a UV curing resin, the fiber module 74 can be easily manufactured. The fiber holder 80 may be formed of zirconia or stainless steel.

Figure 8:
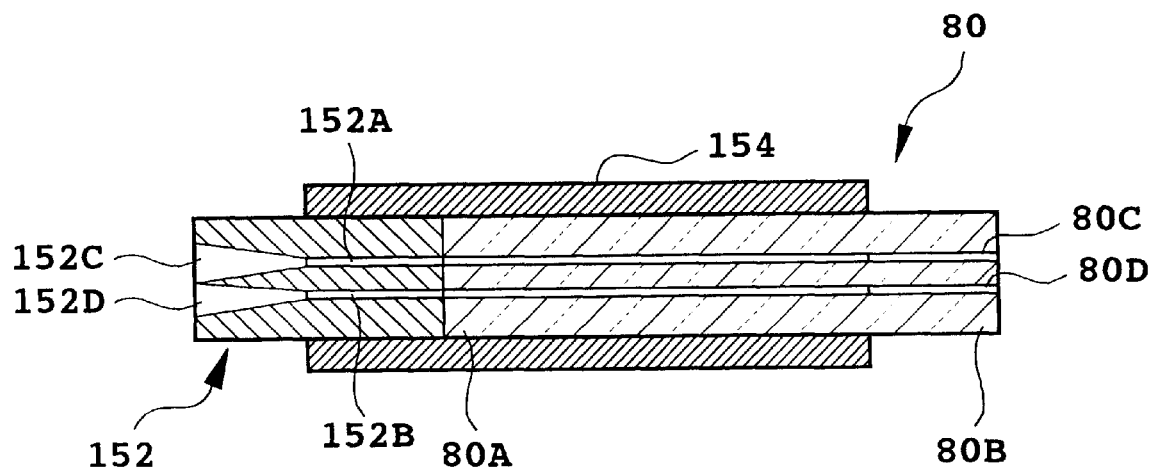
FIG. 8 is a sectional view for illustrating a manufacturing method of the fiber module shown in FIG. 4.

FIG. 8 is a sectional view for illustrating an example of a manufacturing method for the fiber module 74 shown in FIG. 4. In this case, the fiber holder 80 does not have the curved portion 80E. This method employs a jig 152 having the same diameter as that of the fiber holder 80 and having holes 152A and 152B respectively corresponding to the holes 80C and 80D of the fiber holder 80. The jig 152 further has tapering portions 152C and 152D respectively communicating with the holes 152A and 152B.

The jig 152 and the fiber holder 80 are inserted into a sleeve 154 in such a manner that the hole 152A is aligned with the hole 80C and that the hole 152B is aligned with the hole 80D. By inserting the doped fibers 76 and 78 (each having an extra length portion) from the tapering portions 152C and 152D into the holes 152A and 152B, respectively, the doped fibers 76 and 78 can be easily inserted into the holes 80C and 80D of the fiber holder 80 having no tapering portions, respectively.

Thereafter, the fiber holder 80 is removed from the sleeve 154, and the extra length portions of the doped fibers 76 and 78 are cut off. Polishing the fiber holder 80 and the doped fibers 76 and 78 is next carried out until the length of each of the doped fibers 76 and 78 becomes an optimum value ±1%. Thereafter, the antireflection films 82 and 84 are formed.

Figure 9:
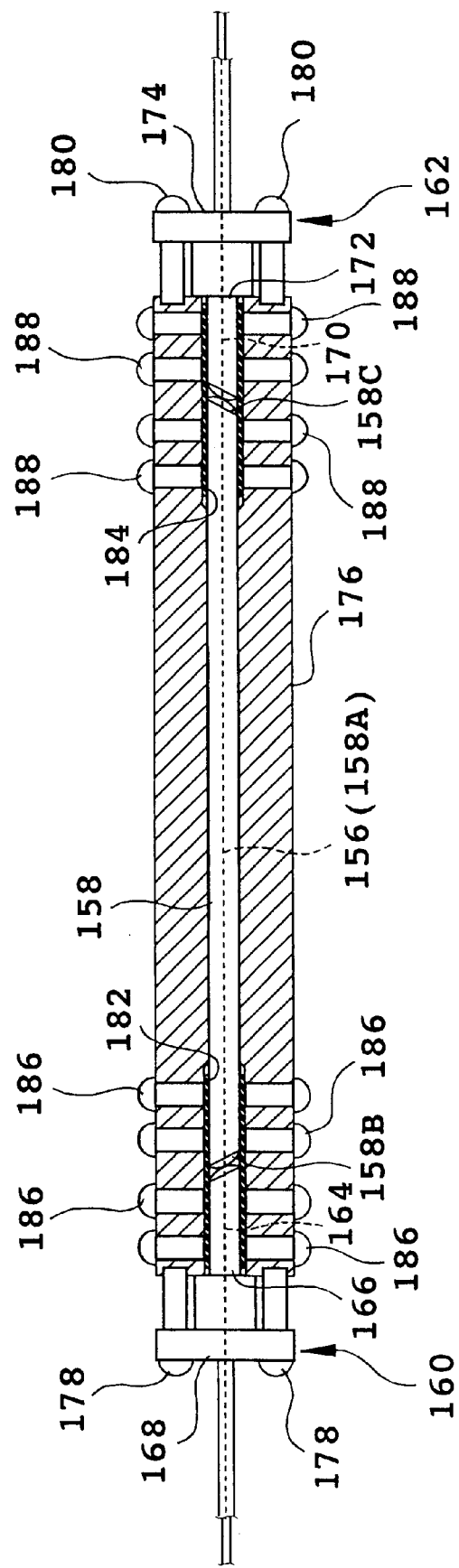
FIG. 9 is a sectional view showing another preferred embodiment of the fiber module according to the present invention.

FIG. 9 is a sectional view showing another preferred embodiment of the fiber module applicable to a rare earth doped nonsilica fiber. In this preferred embodiment, a doped fiber 156 provided by an Er doped fluoride glass fiber is used. The doped fiber 156 is inserted and fixed in a hole 158A of a fiber holder 158 provided by a glass pipe, for example. The hole 158A extends from a first end portion 158B to a second end portion 158C of the fiber holder 158.

The sealing means for hermetically sealing the first end portion 158B and the second end portion 158C of the fiber holder 158 is provided by first and second fiber assemblies 160 and 162 abutting against the first end portion 158B and the second end portion 158C, respectively. The fiber assembly 160 includes a silica fiber 164, a ferrule 166 in which the silica fiber 164 is inserted and fixed, and a flanged member 168 mounted on the ferrule 166. The fiber assembly 162 includes a silica fiber 170, a ferrule 172 in which the silica fiber 170 is inserted and fixed, and a flanged member 174 mounted on the ferrule 172.

The opposite end faces of the fiber holder 158 are angled-PC polished, and correspondingly the first end faces of the ferrules 166 and 172 are similarly polished. That is, each end face of the fiber holder 158 and the ferrules 166 and 172 is polished substantially spherically, and each end face of the fibers 156, 164, and 170 exposed to the corresponding end face of the fiber holder 158 and the ferrules 166 and 172 is inclined with respect to a plane perpendicular to the corresponding fiber axis.

The fiber holder 158 and the ferrules 166 and 172 are accommodated in a housing 176. The flanged member 168 is secured to one end of the housing 176 by screws 178, and the flanged member 174 is secured to the other end of the housing 176 by screws 180, thereby applying proper pressures to butt joint portions of the doped fiber 156 and the silica fiber 164 and to butt joint portions of the doped fiber 156 and the silica fiber 170.

The first end portion 158B of the fiber holder 158 and the ferrule 166 are inserted in an elastically deformable sleeve (e.g., slit sleeve) 182. A plurality of screws 186 are threadedly engaged with the housing 176 in its radial direction so as to be arranged in the longitudinal direction and circumferential direction of the ferrule 166 and the fiber holder 158. By tightening the plural screws 186, the sleeve 182 is elastically deformed to effect alignment of the doped fiber 156 and the silica fiber 164. Similarly, a sleeve 184 and a plurality of screws 188 are provided to effect alignment of the doped fiber 156 and the silica fiber 170.

Generally in a rare earth doped nonsilica fiber, the core tends to be eccentric in its fabrication technique.

Accordingly, by adopting such a mechanism for alignment of fibers to be butted, a low-loss interface with respect to the doped fiber 156 can be obtained.

Optionally, a film for matching refractive indices may be interposed between the butt joint portions of the doped fiber 156 and each silica fiber, so as to reduce Fresnel reflection loss.

According to this preferred embodiment, the fiber assemblies 160 and 162 abut against the first end portion 158B and the second end portion 158C of the fiber holder 158, respectively. Accordingly, the doped fiber 156 can be shut off from the outside air to thereby ensure the physical or chemical stability of the doped fiber 156. As a result, the reliability of an optical amplifier using this fiber module can be improved.

Further, since each end face of the fiber holder 158 is angled-PC polished, there is no possibility of formation of an optical resonator structure including the doped fiber 156, thereby preventing the unstable operation of the optical amplifier due to oscillation or the like.

The details of the above-mentioned preferred embodiments may be combined to carry out the present invention. For example, antireflection films may be formed on the opposite ends of the fiber holder 158 shown in FIG. 9 to thereby configure the sealing means. In this case, the doped fiber 156 can be optically connected to optical fibers for transmission by spatial coupling using lenses.

Although not shown, a heater or Peltier element may be provided to change the temperature of the rare earth doped nonsilica fiber, thereby making variable the amplification characteristic, e.g., the wavelength characteristic of gain.

The optical amplifier according to the present invention may be used as a white light source. By pumping a rare earth doped nonsilica fiber, ASE (amplified spontaneous emission) having a relatively gentle spectrum is generated. Accordingly, by outputting this ASE, a high-performance white light source suitable for optical measurement or the like can be obtained. In this case, there is no need for the optical means optically connected to the first end portion and the second end portion of the fiber holder to propagate the signal light to be amplified in the rare earth doped nonsilica fiber. For example, in the case of using the optical amplifier shown in FIG. 4 as a white light source, the input fiber collimator 44 and the optical isolator 144 are not required.

While Er is used as an example of the rare earth in the above preferred embodiments, the rare earth usable in the present invention is not limited to Er. For example, Pr (praseodymium) or Nd (neodymium) may be doped in a nonsilica fiber in view of the fact that it is difficult to dope Pr or Nd in a silica fiber. With this configuration, it is possible to provide an optical amplifier for providing a gain band including 1.3 $\mu$m.

While a fluoride glass fiber is used as an example of the nonsilica fiber in the above preferred embodiments, the nonsilica fiber usable in the present invention is not limited to a fluoride glass fiber. For example, a tellurite glass fiber or any other nonsilica fibers may be used as the nonsilica fiber in the present invention.

While a rare earth doped nonsilica fiber is used as an example of the optical amplifying medium for providing a gain band by optical pumping, the optical amplifying medium usable in the present invention is not limited to a rare earth doped nonsilica fiber. For example, a rare earth may be doped in an optical waveguide structure such as an optical waveguide path formed on a waveguide path substrate to thereby obtain the optical amplifying medium. The optical waveguide structure is composed of a core portion having a relatively high refractive index and a clad portion provided so as to surround the core portion having a relatively low refractive index, and the rare earth is doped in at least the core portion.

According to the present invention as described above, it is possible to provide an optical amplifier reduced in gain deviation and improved in reliability or to provide a fiber module applicable to the optical amplifier. Further, it is possible to improve the reliability of an optical amplifier having a rare earth doped nonsilica fiber. Further, it is possible to provide an optical amplifier improved in pumping efficiency by a pump light beam or to provide a fiber module applicable to the optical amplifier. Further, it is also possible to provide an apparatus usable as a high-performance white light source. The other effects obtained by the specific preferred embodiments of the present invention have been described above, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical amplifier comprising:
a nonsilica fiber doped with a rare earth element;
a fiber holder having a first end portion, a second end portion, and a hole extending between said first end portion and said second end portion, said nonsilica fiber being inserted and fixed in said hole;
sealing means for hermetically sealing said first end portion and said second end portion of said fiber holder;
optical means optically connected to said first end portion and said second end portion so that signal light to be amplified propagates in said nonsilica fiber; and
means for pumping said nonsilica fiber so that said nonsilica fiber provides a gain band including the wavelength of said signal light,
said nonsilica fiber comprising a first nonsilica fiber having a first end and a second end respectively corresponding to said first end portion and said second end portion of said fiber holder, and a second nonsilica fiber having a third end and a fourth end respectively corresponding to said first end portion and said second end portion of said fiber holder.

2. An optical amplifier comprising:
a nonsilica fiber doped with a rare earth element;
a fiber holder having a first end portion, a second end portion, and a hole extending between said first end portion and said second end portion, said nonsilica fiber being inserted and fixed in said hole;
sealing means for hermetically sealing said first end portion and said second end portion of said fiber holder;
optical means optically connected to said first end portion and said second end portion so that signal light to be amplified propagates in said nonsilica fiber; and
means for pumping said nonsilica fiber so that said nonsilica fiber provides a gain band including the wavelength of said signal light,
said sealing means comprising antireflection films formed on said first end portion and said second end portion of said fiber holder so as to cover end faces of said nonsilica fiber.

3. An optical amplifier comprising:
a nonsilica fiber doped with a rare earth element;
a fiber holder having a first end portion, a second end portion, and a hole extending between said first end portion and said second end portion, said nonsilica fiber being inserted and fixed in said hole;
sealing means for hermetically sealing said first end portion and said second end portion of said fiber holder;
optical means optically connected to said first end portion and said second end portion so that signal light to be amplified propagates in said nonsilica fiber; and
means for pumping said nonsilica fiber so that said nonsilica fiber provides a gain band including the wavelength of said signal light;
said optical means comprising first and second lenses respectively opposed to said first end portion and said second end portion of said fiber holder;
said optical amplifier further comprising a first sleeve in which said first lens and said first end portion of said fiber holder are inserted, and a second sleeve in which said second lens and said second end portion of said fiber holder are inserted;
whereby hermetic sealing of said first end portion and said second end portion of said fiber holder by said sealing means is enhanced.

4. An optical amplifier comprising:
a nonsilica fiber doped with a rare earth element;
a fiber holder having a first end portion, a second end portion, and a hole extending between said first end portion and said second end portion, said nonsilica fiber being inserted and fixed in said hole;
sealing means for hermetically sealing said first end portion and said second end portion of said fiber holder;
optical means optically connected to said first end portion and said second end portion so that signal light to be amplified propagates in said nonsilica fiber; and
means for pumping said nonsilica fiber so that said nonsilica fiber provides a gain band including the wavelength of said signal light;
said nonsilica fiber comprising a first nonsilica fiber having a first end and a second end respectively corresponding to said first end portion and said second end portion of said fiber holder, and a second nonsilica fiber having a third end and a fourth end respectively corresponding to said first end portion and said second end portion of said fiber holder; and
said rare earth element being selected from the group consisting of Er (erbium), Pr (praseodymium), and Nd (neodymium).

5. An optical amplifier comprising:
a nonsilica fiber doped with a rare earth element;
a fiber holder having a first end portion, a second end portion, and a hole extending between said first end portion and said second end portion, said nonsilica fiber being inserted and fixed in said hole;
sealing means for hermetically sealing said first end portion and said second end portion of said fiber holder;
optical means optically connected to said first end portion and said second end portion so that signal light to be amplified propagates in said nonsilica fiber; and
means for pumping said nonsilica fiber so that said nonsilica fiber provides a gain band including the wavelength of said signal light;
said nonsilica fiber comprising a first nonsilica fiber having a first end and a second end respectively corresponding to said first end portion and said second end portion of said fiber holder, and a second nonsilica fiber having a third end and a fourth end respectively corresponding to said first end portion and said second end portion of said fiber holder; and said nonsilica fiber being selected from the group consisting of a fluoride glass fiber and a tellurite glass fiber.

6. An optical amplifier comprising:

a nonsilica fiber doped with a rare earth element;

a fiber holder having a first end portion, a second end portion, and a hole extending between said first end portion and said second end portion, said nonsilica fiber being inserted and fixed in said hole;

sealing means for hermetically sealing said first end portion and said second end portion of said fiber holder;

optical means optically connected to said first end portion and said second end portion so that signal light to be amplified propagates in said nonsilica fiber; and means for pumping said nonsilica fiber so that said nonsilica fiber provides a gain band including the wavelength of said signal light;

said nonsilica fiber comprising a first nonsilica fiber having a first end and a second end respectively corresponding to said first end portion and said second end portion of said fiber holder, and a second nonsilica fiber having a third end and a fourth end respectively corresponding to said first end portion and said second end portion of said fiber holder; and the doping concentration of said rare earth element being 50,000 ppm or more, so that the length of said nonsilica fiber is reduced sufficiently in practical use.

7. An optical amplifier according to claim 1, wherein:

at least a part of said first nonsilica fiber near said first end and said second end is substantially parallel to said second nonsilica fiber.

8. An optical amplifier according to claim 1, wherein:

said optical means comprises a first lens for coupling said signal light to be amplified to said first end of said first nonsilica fiber, and a second lens and a first reflector for coupling said second end of said first nonsilica fiber and said fourth end of said second nonsilica fiber through said signal light; and said pumping means comprises first pumping means for supplying a first pump light beam into said second nonsilica fiber from said fourth end, second pumping means for supplying a second pump light beam into said first nonsilica fiber from said second end, and a second reflector for coupling said first end of said first nonsilica fiber and said third end of said second nonsilica fiber through said first and second pump light beams.

9. An optical amplifier according to claim 8, wherein:

said first reflector is provided by a first optical filter for reflecting said signal light and transmitting said first and second pump light beams; and said second reflector is provided by a second optical filter for transmitting said signal light and reflecting said first and second pump light beams.

10. An optical amplifier according to claim 9, wherein:

each of said first and second pump light beams has a wavelength shorter than the wavelength of said signal light; and said first and second optical filters are a short-wave pass filter and a long-wave pass filter, respectively.

11. An optical amplifier according to claim 9, further comprising:

an input fiber collimator for outputting said signal light to be amplified, and an output fiber collimator for inputting amplified signal light thereto;

said signal light to be amplified, output from said input fiber collimator being supplied through said second optical filter and said first lens to said first end of said first nonsilica fiber;

said amplified signal light output from said third end of said second nonsilica fiber being supplied through said first lens and said second optical filter to said output fiber collimator.

12. An optical amplifier according to claim 9, wherein:

said first pumping means comprises first and second laser diodes for respectively outputting first and second polarization beams having polarization planes orthogonal to each other, and a first polarization beam combiner for combining said first and second polarization beams to thereby output said first pump light beam; and said second pumping means comprises third and fourth laser diodes for respectively outputting third and fourth polarization beams having polarization planes orthogonal to each other, and a second polarization beam combiner for combining said third and fourth polarization beams to thereby output it as said second pump light beam;

said first pump light beam being supplied through said first optical filter and said second lens to said fourth end of said second nonsilica fiber;

said second pump light beam being supplied through said first optical filter and said second lens to said second end of said first nonsilica fiber.

13. An optical amplifier according to claim 17, wherein:

each of said first and second polarization beam combiners comprises a birefringent prism.

14. An optical amplifier according to claim 1, further comprising:

at least one optical isolator provided along an optical path of said signal light.

15. An optical amplifier according to claim 1, further comprising:

an optical filter provided along an optical path of said signal light for equalizing gains of said optical amplifier.

16. An optical amplifier according to claim 1, wherein said fiber holder has a curved portion.

17. An optical amplifier according to claim 16, wherein said fiber holder is bent substantially 90° to 180° at said curved portion.

18. An optical amplifier according to claim 16, further comprising a photodetector provided outside of said curved portion of said fiber holder for receiving leaky mode light from said nonsilica fiber.

19. An optical amplifier according to claim 1, wherein:

said fiber holder is formed of glass; and said nonsilica fiber is fixed in said hole of said fiber holder by a UV curing resin.

20. An optical amplifier comprising:

a first optical waveguide structure doped with a rare earth element and having a first end and a second end;

a second optical waveguide structure doped with a rare earth element and having a third end and a fourth end respectively corresponding to said first end and said second end;

a first lens opposed to said first end and said third end;

a second lens opposed to said second end and said fourth end;

first and second pump light sources for respectively outputting first and second pump light beams; and a reflector provided near a focal point of said second lens for coupling said second end of said first optical waveguide structure and said fourth end of said second optical waveguide structure by reflection of signal light;

said first pump light beam being supplied through said reflector and said second lens to said second end of said first optical waveguide structure;

said second pump light beam being supplied through said reflector and said second lens to said fourth end of said second optical waveguide structure;

said first end of said first optical waveguide structure and said third end of said second optical waveguide structure being coupled through said first lens to an input port and an output port for said signal light, respectively.

21. An optical amplifier according to claim 20, wherein:

said reflector is provided by a first optical filter for reflecting said signal light and transmitting said first and second pump light beams;

said optical amplifier further comprising a second optical filter provided near a focal point of said first lens for transmitting said signal light and reflecting said first and second pump light beams.

22. An optical amplifier according to claim 20, wherein:

said first and second optical waveguide structures are substantially parallel to each other near at least their ends.

23. An optical amplifier according to claim 20, wherein:

said first and second optical waveguide structures are provided by first and second nonsilica fibers, respectively;

said optical amplifier further comprising a fiber holder having a pair of holes in which said first and second nonsilica fibers are inserted and fixed.

24. An optical amplifier according to claim 23, further comprising:

first and second sleeves for respectively mounting said first and second lenses to said fiber holder;

whereby said first end and said third end are sealed by a space defined by said first lens, said first sleeve, and said fiber holder, and said second end and said fourth end are sealed by a space defined by said second lens, said second sleeve, and said fiber holder.

25. An optical amplifier according to claim 23, further comprising:

antireflection films formed on opposite ends of said fiber holder, whereby said first end to said fourth end are cut off from the outside air.

26. An optical amplifier according to claim 20, wherein each of said input port and said output port is provided by a fiber collimator.

27. A fiber module for optical amplification, comprising:

a nonsilica fiber doped with a rare earth element;

a fiber holder having a first end portion, a second end portion, and a hole extending between said first end portion and said second end portion, said nonsilica fiber being inserted and fixed in said hole; and sealing means for hermetically sealing said first end portion and said second end portion of said fiber holder, said sealing means comprising
antireflection films formed on said first end portion and said second end portion of said fiber holder so as to cover end faces of said nonsilica fiber.

28. A fiber module for optical amplification, comprising:

a nonsilica fiber doped with a rare earth element;

a fiber holder having a first end portion, a second end portion, and a hole extending between said first end portion and said second end portion, said nonsilica fiber being inserted and fixed in said hole; and sealing means for hermetically sealing said first end portion and said second end portion of said fiber holder, wherein
each of said first end portion and said second end portion of said fiber holder is polished substantially spherically;
said sealing means comprises first and second fiber assemblies respectively abutting against said first end portion and said second end portion of said fiber holder; and
each of said first and second fiber assemblies comprises a silica fiber and a ferrule having a hole in which said silica fiber is inserted and fixed.

29. A fiber module according to claim 28, further comprising:

a means for axially aligning each of said first and second fiber assemblies with said fiber holder.

30. A fiber module for optical amplification, comprising:

a nonsilica fiber doped with a rare earth element;

a fiber holder having a first end portion, a second end portion, and a hole extending between said first end portion and said second end portion, said nonsilica fiber being inserted and fixed in said hole;

first and second lenses respectively opposed to said first end portion and said second end portion of said fiber holder;

a first sleeve in which said first lens and said first end portion of said fiber holder are inserted; and a second sleeve in which said second lens and said second end portion of said fiber holder are inserted.

31. An apparatus comprising:

a nonsilica fiber doped with a rare earth element;

a fiber holder having a first end portion, a second end portion, and a hole extending between said first end portion and said second end portion, said nonsilica fiber being inserted and fixed in said hole;

sealing means for hermetically sealing said first end portion and said second end portion of said fiber holder; and means for pumping said nonsilica fiber so that said nonsilica fiber provides a gain band, said nonsilica fiber comprising a first nonsilica fiber having a first end of a second end respectively corresponding to said first end portion and said second end portion of said fiber holder, and a second nonsilica fiber having a third end and a fourth end respectively corresponding to said first end portion and said second end portion of said fiber holder.

* * * * *

UNITED STATES PATENT AND TRADEMARK OFFICE
CERTIFICATE OF CORRECTION

PATENT NO. : 6,310,717 B1
DATED : October 30, 2001
INVENTOR(S) : Norihisa Naganuma et al.

It is certified that error appears in the above-identified patent and that said Letters Patent is hereby corrected as shown below:

Title page,
Item [56], FOREIGN DOCUMENTS, change "0653575" to -- 06053575 --.

Column 20,
Line 35, change "17" to -- 12 --.

Signed and Sealed this

Seventh Day of May, 2002

Attest:

Attesting Officer

JAMES E. ROGAN
Director of the United States Patent and Trademark Office